United States Patent [19]

McKeehan et al.

[11] Patent Number: 4,528,757

[45] Date of Patent: Jul. 16, 1985

[54] REMOTELY OPERABLE APPARATUS AND METHOD FOR DETERMINING THE DISTANCE AND ANGULAR ORIENTATION BETWEEN TWO STRUCTURALLY UNCONNECTED MEMBERS

[75] Inventors: David S. McKeehan; Frans Kopp, both of Houston, Tex.

[73] Assignee: Exxon Production Research Co., Houston, Tex.

[21] Appl. No.: 621,840

[22] Filed: Jun. 18, 1984

[51] Int. Cl.³ .......................... G01B 5/14; G01B 5/25; G01B 3/30

[52] U.S. Cl. .................... 33/529; 33/180 R; 33/562

[58] Field of Search ................ 33/180 R, 174 N, 158, 33/160, 161, 412

[56] References Cited

U.S. PATENT DOCUMENTS

| | | | |
|---|---|---|---|
| 2,431,101 | 11/1947 | Woods | 33/174 N |
| 3,418,721 | 12/1968 | Christensen | 33/180 |
| 3,586,103 | 6/1971 | Brown et al. | 166/0.6 |
| 3,618,661 | 11/1971 | Peterman | 166/0.5 |
| 3,667,128 | 6/1972 | Morgan | 33/174 N |
| 3,854,211 | 12/1974 | Oliver et al. | 33/174 N |
| 4,231,161 | 11/1980 | Belfiore | 33/412 |

Primary Examiner—Willis Little
Attorney, Agent, or Firm—Keith A. Bell

[57] ABSTRACT

A remotely operable apparatus and method for determining from a remote location the distance and angular orientation between two structurally unconnected members, such as two sections of a subsea pipeline, is disclosed. The apparatus of the invention comprises generally two remotely releasable guide posts disposed, respectively, in known spaced relationships to the two structurally unconnected members and a remotely operable measuring template. The remotely operable measuring template is adapted to telescope axially and includes two ball and socket joints to compensate for misalignment or differences in elevation between the guide posts. In practicing the method of the invention, the remotely operable measuring template is positioned over and firmly attached to the guide posts. All movable joints of the template are then locked and the guide posts are remotely released. The guide posts may then be retrieved to the remote location in the same spaced relationship as originally disposed. The distance and angular orientation between the guide posts may then be measured at the remote location and the distance and angular orientation between the two structurally unconnected members may be computed from such measurement.

24 Claims, 8 Drawing Figures

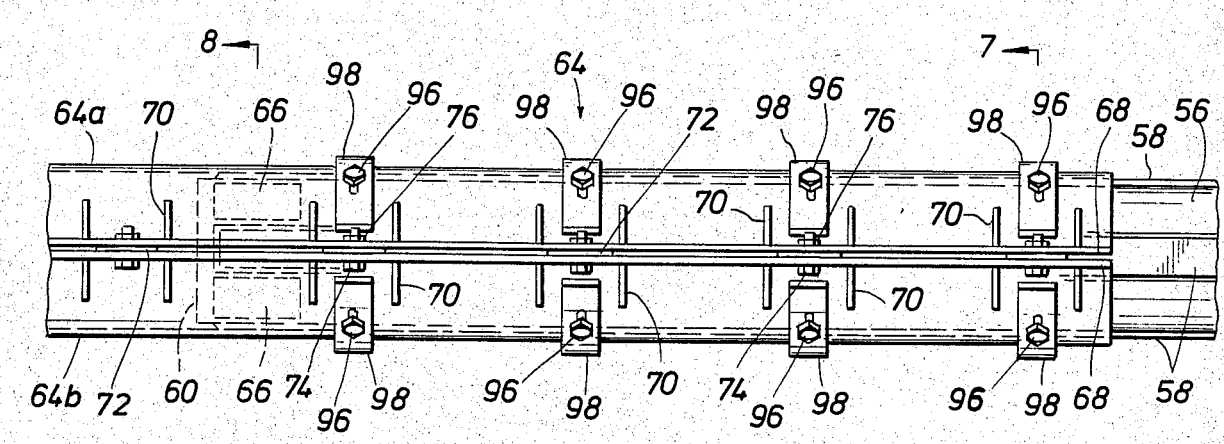
FIG. 6
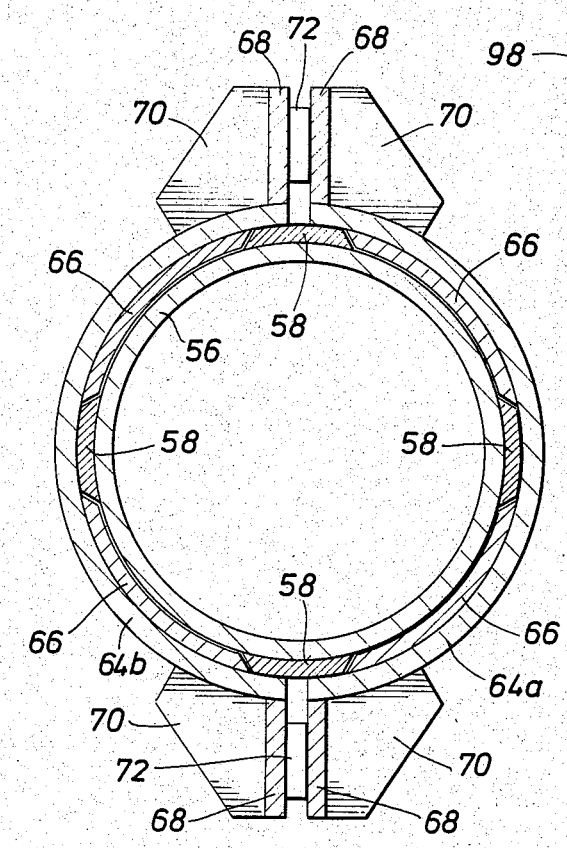
FIG. 8
(ROTATED 90°)
FIG. 7
(ROTATED 90°)

REMOTELY OPERABLE APPARATUS AND METHOD FOR DETERMINING THE DISTANCE AND ANGULAR ORIENTATION BETWEEN TWO STRUCTURALLY UNCONNECTED MEMBERS

FIELD OF THE INVENTION

This invention relates to a remotely operable apparatus and method for determining from a remote location the distance and angular orientation between two structurally unconnected members, such as two sections of a subsea pipeline.

BACKGROUND OF THE INVENTION

Offshore hydrocarbon producing operations typically require the installation of subsea pipelines to transport the hydrocarbon products from one location to another. In many situations, installation of a subsea pipeline requires that the ends of two unconnected sections of pipeline disposed on the marine bottom must be connected by a specially fabricated spool piece which can only be fabricated by knowing the distance and angular orientation between the ends of the two unconnected sections. Heretofore, these distance and angular orientation measurements have been obtained by utilizing the services of a diver or a manned submersible vessel.

Water depths of interest to the offshore petroleum industry have now increased to the point where use of a diver or a manned submersible vessel to obtain the distance and angular orientation measurements is either prohibitively expensive or impractical. Further, in deep waters the hazards associated with manned subsea operations may be excessive. Accordingly, the need exists for a remotely operable apparatus and method which can be used to determine the distance and angular orientation between two structurally unconnected sections of a subsea pipeline without requiring manned subsea operations.

SUMMARY OF THE INVENTION

The present invention solves the problem outlined above through the use of a remotely operable measuring template and two remotely releasable guide posts disposed, respectively, in known spaced relationships to the ends of the unconnected sections of subsea pipeline. The remotely operable measuring template is adapted to engage the two remotely releasable guide posts and return them to the surface of the body of water without altering the spaced relationship therebetween. At the surface of the body of water, the distance and angular orientation between the guide posts may be measured. Since the distance and angular orientation between each of the unconnected ends of the subsea pipeline and its respective guide post is known, the distance and angular orientation between the unconnected ends of the subsea pipeline may then be computed and the spool piece may be fabricated.

The remotely operable measuring template generally comprises a variable length frame member having a female member and a splined male member adapted to telescope into and out of the female member, two ball and socket joints disposed, respectively, on the outer ends of the female and male members, and two guide cones attached, respectively, to the two ball and socket joints. The guide cones are adapted to fit, respectively, over the two remotely releasable guide posts and include means for locking the guide posts into the guide cones after the remotely operable measuring template has been properly positioned. Typically, the locking means comprises a plurality of screws which are retracted during positioning of the remotely operable measuring template and are thereafter advanced to firmly lock the guide posts in place. The remotely operable measuring template also includes means for locking the ball and socket joints and means for locking the variable length frame member after the remotely operable measuring template has been properly positioned. Typically, each of these locking means also comprises a plurality of screws which are retracted during positioning of the remotely operable measuring template so as to not interfere with the movement of the variable length frame member and the ball and socket joints and are thereafter advanced to firmly lock the variable length frame member and the ball and socket joints in place.

Each of the unconnected ends of the subsea pipeline has associated therewith a base structure. The guide posts are releasably mounted to the respective base structures in known spaced relationships to the ends of the subsea pipeline. Typically, each guide post is attached to its base structure by a plurality of screws which may be remotely retracted. Guidelines extending upwardly to the surface of the body of water are attached to the upper ends of the remotely releasable guide posts. These guidelines are threaded through the guide cones to aid in proper positioning of the remotely operable measuring template.

The apparatus of the present invention may also include one or more redundant guide posts mounted on each of the base structures. The redundant guide posts may be used if it becomes necessary to recalculate or verify the distance and angular orientation measurements made with the primary guide posts.

Typically, an acoustic transponder is mounted on each of the base structures near the primary guide posts. The acoustic transponders are used to obtain an approximation of the distance between the primary guide posts. A remotely operable measuring template is then selected such that the operating range of the template is larger than the approximation of the distance between the primary guide posts.

In practicing the method of the present invention, the remotely operable measuring template is lowered from the surface of the body of water by a cable. As noted above, the guidelines attached to the upper ends of the two primary guide posts aid in guiding the guide cones into proper engagement with their respective guide posts. The variable length frame member is allowed to telescope during positioning and the ball and socket joints are allowed to pivot to accommodate for any misalignment or differences in elevation between the two primary guide posts. Proper positioning of the remotely operable measuring template may be confirmed by a remotely operated vehicle or an underwater television camera.

After the remotely operable measuring template has been properly positioned, a remotely operated vehicle is used to tighten the various screws to lock the guide posts into their respective guide cones and to prevent further movement of the variable length frame member and the ball and socket joints. The guidelines may then be remotely released from their respective guide posts. Alternatively, the guidelines may be retrieved along with their respective guide posts. The remotely operated vehicle then retracts the screws used to attach the guide posts to their respective base structures. The remotely operable measuring template and the guide posts are then retrieved to the surface of the body of water. The remotely operable measuring template holds the two guide posts in the same spaced relationship as existed on the marine bottom. At the surface, this spaced relationship is measured and the distance and angular orientation between the unconnected ends of the subsea pipeline is computed. The spool piece may then be fabricated.

A further feature of the present invention is that additional guide posts and additional guidelines may be attached to each of the base structures. Following fabrication, the spool piece may be attached to a guide frame which is then lowered along these guidelines into engagement with these guide posts. A remotely operated vehicle may then be used to accomplish the final connections between the spool piece and the unconnected ends of the subsea pipeline.

BRIEF DESCRIPTION OF THE DRAWINGS

The actual operation and advantages of the present invention will be better understood by referring to the following detailed description and the attached drawings in which:

FIG. 6 is a plan view taken along line 6—6 of FIG. 3;

FIG. 7 is a cross-sectional view taken along line 7—7 of FIG. 6 and rotated 90°; and FIG. 8 is a cross-sectional view taken along line 8—8 of FIG. 6 and rotated 90°.

While the invention will be described in connection with the preferred embodiment, it will be understood that the invention is not limited to that embodiment. On the contrary, it is intended to cover all alternatives, modifications, and equivalents, which may be included within the spirit and scope of the invention, as defined by the appended claims.

DETAILED DESCRIPTION OF THE PREFERRED EMBODIMENT

Figure 1:
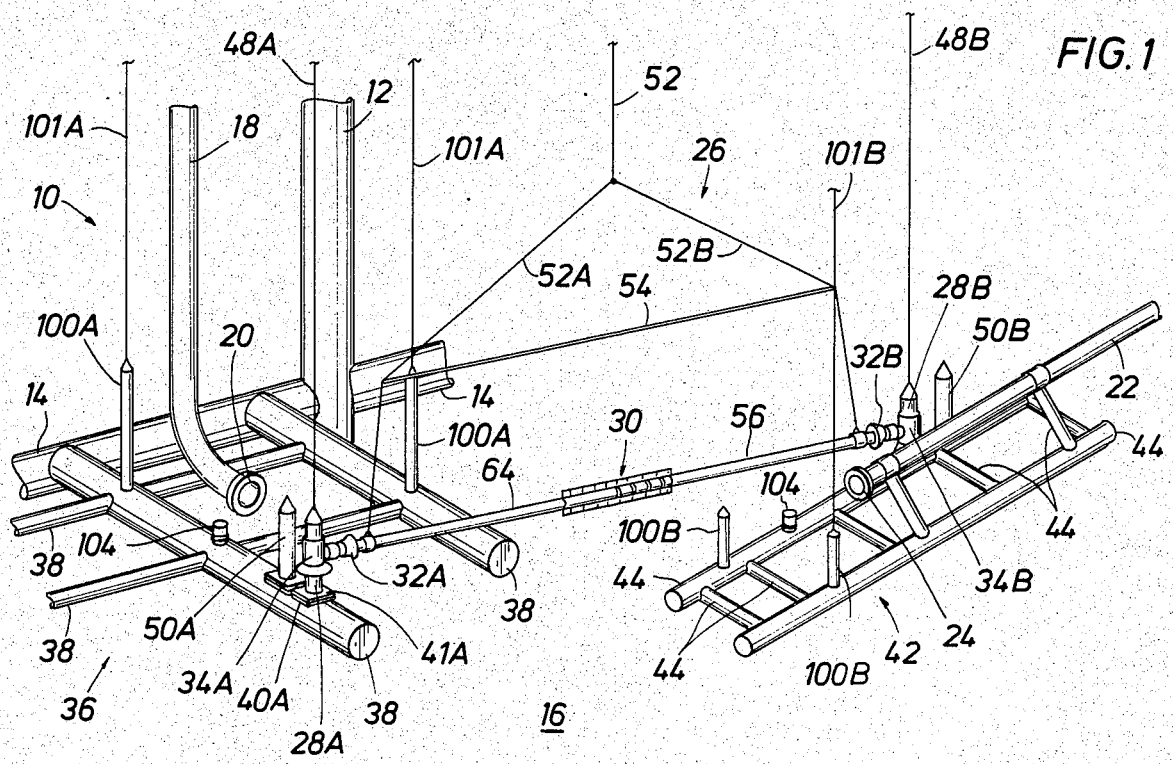
FIGS. 1 and 2 are partial perspective views illustrating the use of the present invention to determine the distance and angular orientation between a pipeline lying on the marine bottom and an offshore platform riser.
Figure 2:
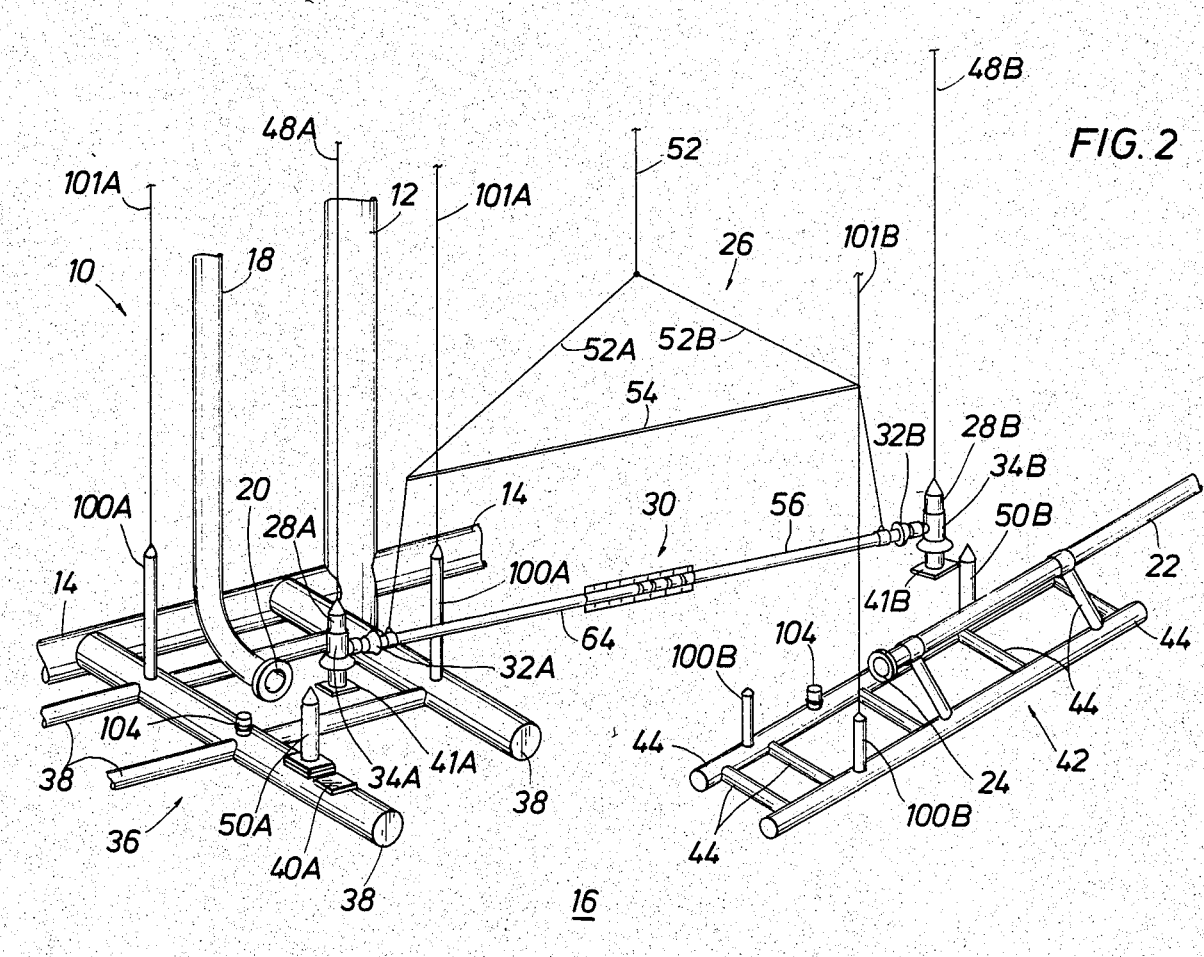

Referring now to FIGS. 1 and 2, an offshore platform structure 10 having a plurality of legs 12 (one shown) and a plurality of brace members 14 is disposed on marine bottom 16. A conventional platform riser 18 is secured to the structure 10 using known means (not shown) and its end 20 is positioned adjacent the marine bottom 16. A subsea pipeline 22 is disposed on marine bottom 16 and its end 24 is positioned in a spaced relationship from riser end 20, the distance and angular orientation between riser end 20 and pipeline end 24 being unknown. It is desired to determine the distance and angular orientation between riser end 20 and pipeline end 24 in order to fabricate a spool piece (not shown) to connect riser 18 and pipeline 22.

Figure 3:
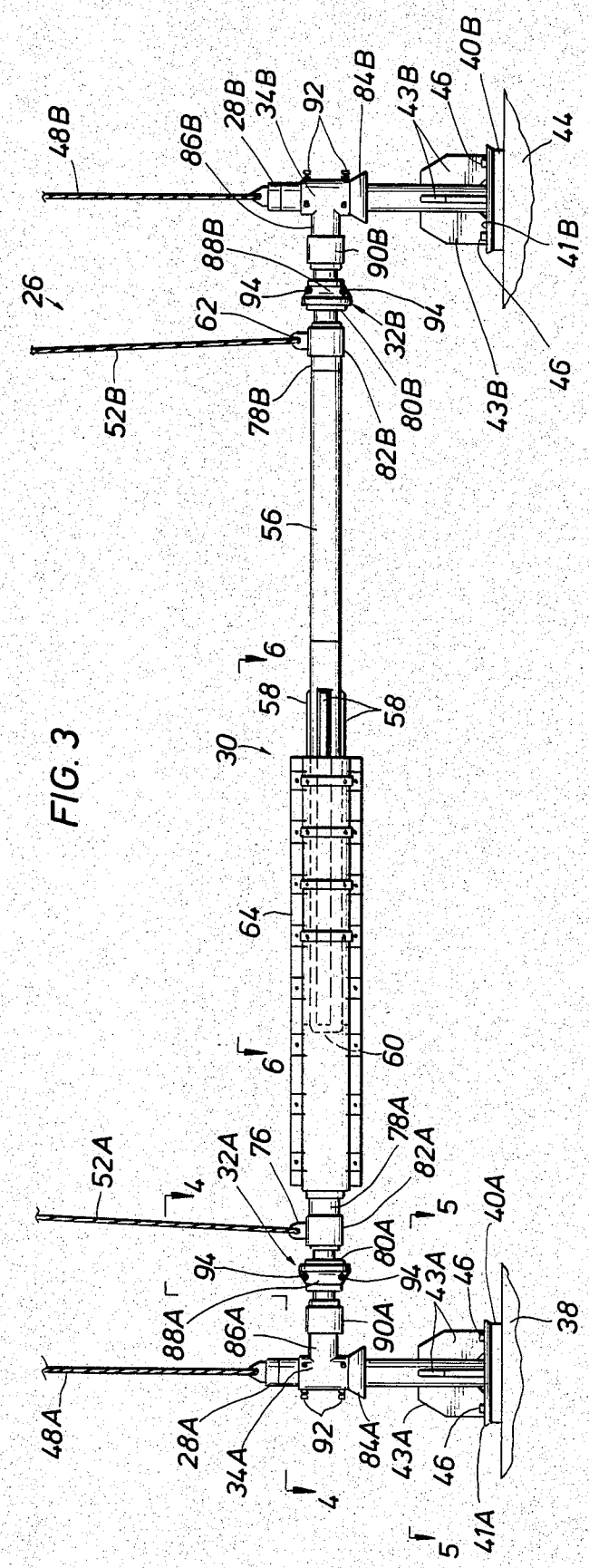
FIG. 3 is an elevational view illustrating one embodiment of the present invention.

In accordance with the method and apparatus of the present invention, the distance and angular orientation between riser end 20 and pipeline end 24 is determined through the use of a remotely operable measuring template, generally indicated at 26, and two remotely releasable guide posts 28A, 28B which are disposed, respectively, in known spaced relationships to riser end 20 and pipeline end 24. As best illustrated in FIG. 3, remotely operable measuring template 26 generally comprises a variable length frame member 30, two ball and socket joints 32A, 32B disposed, respectively, on the opposite ends of variable length frame member 30, and two guide cones 34A, 34B attached, respectively, to ball and socket joints 32A, 32B. As will be described in more detail below, remotely operable measuring template 26 also includes means for locking each of the guide cones 34A, 34B to its respective guide post 28A, 28B and means for locking variable length frame member 30 and ball and socket joints 32A, 32B after remotely operable measuring template 26 has been properly positioned.

Referring again to FIGS. 1 and 2, a guide base structure, generally indicated at 36, is attached to structure 10 and rests on marine bottom 16. Guide base structure 36 comprises a plurality of interconnected tubular members 38 which, optionally, may be of the same or different sizes. A guide post attachment pad 40A (best illustrated in FIG. 2) is welded or otherwise attached to one of the tubular members 38 in a known, spaced relationship to riser end 20. As will be further described below, guide post 28A is releasably attached to attachment pad 40A.

A pipeline support base structure, generally indicated at 42, comprising a plurality of interconnected tubular members 44 is used to support pipeline end 24. Tubular members 44 optionally may be of the same or different sizes. A guide post attachment pad 40B (shown only in FIG. 3), similar to attachment pad 40A, is welded or otherwise attached to one of the tubular members 44 in a known, spaced relationship to pipeline end 24. Guide post 28B is releasably attached to attachment pad 40B.

Figure 5:
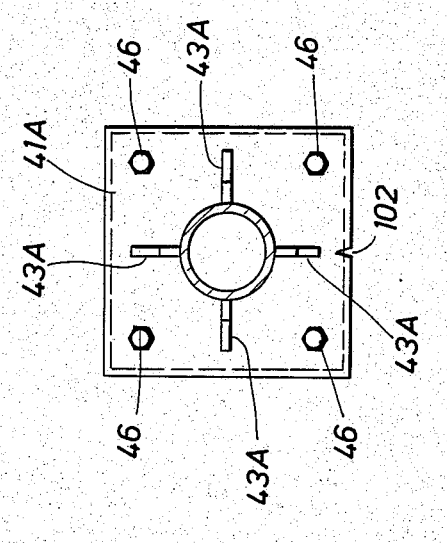
FIG. 5 is a plan view, in partial section, taken along line 5—5 of FIG. 3.

With reference now to FIGS. 3 and 5, the attachment of remotely releasable guide posts 28A, 28B to attachment pads 40A, 40B, respectively, will be described in greater detail. Each of the guide posts 28A, 28B includes, respectively, a base plate 41A, 41B and a plurality of reinforcing gussets 43A, 43B. Base plates 41A, 41B are releasably attached to attachment pads 40A, 40B by screws 46. A reference mark, such as notch 102, is placed on one side of each of the base plates 41A, 41B, the purpose of which will be hereafter described. A conventional guideline 48A, 48B is attached to the upper end of each of the guide posts 28A, 28B and extends upwardly to the surface of the body of water.

For back-up purposes, one or more redundant guide posts 50A, 50B (see FIGS. 1 and 2) may be provided, respectively, on guide base structure 36 and pipeline support base structure 42. Redundant guide posts 50A, 50B are attached to guide base structure 36 and pipeline support base structure 42 in the manner previously described for guide posts 28A, 28B. Typically, no guidelines are attached to redundant guide posts 50A, 50B. However, in the event that it becomes necessary to recalculate or verify the distance and angular orientation between riser end 20 and pipeline end 24, guidelines would be remotely attached to redundant guide posts 50A, 50B, as is well known in the art, and the measurement would proceed as hereafter described. Additional guide posts 100A, 100B are provided, respectively, on guide base structure 36 and pipeline support base structure 42, the purpose of which will be hereafter described. Guide posts 100A, 100B may include, respectively, guidelines 101A, 101B extending upwardly to the surface of the body of water. Alternatively, guidelines 101A, 101B may be remotely attached at a later time.

In operation, remotely operable measuring template 26 is raised and lowered by means of a cable 52 (see FIGS. 1 and 2). A short distance above variable length frame member 30, cable 52 is split into two sections 52A, 52B which are held apart by a conventional spreader bar 54. Sections 52A, 52B of cable 52 are attached, respectively, to the two telescoping members of variable length frame member 30, as will be hereafter described in greater detail.

As best illustrated in FIGS. 3 and 6, variable length frame member 30 includes two splined members which are free to telescope in an axial direction, but which are prevented from rotation with respect to each other. Male member 56 is of generally tubular construction and includes a plurality of axial splines 58 extending along its surface. Splines 58 extend from the inner end 60 of male member 56 to a point approximately midway between the two ends of male member 56. Section 52B of cable 52 is attached to the outer end of male member 56 by means of pad eye 62.

Female member 64 of variable length frame member 30 is of generally tubular construction and has an inside diameter slightly greater than the outside diameter of the splined portion of male member 56. A plurality of ribs 66 are attached to the inner surface of female member 64, as best illustrated in FIGS. 6 and 8. Ribs 66 and splines 58 cooperate to prevent rotation between male member 56 and female member 64 while permitting male member 56 to freely telescope into and out of female member 64. As illustrated, female member 64 includes only one set of ribs 66 located approximately midway along its length. However, optionally, female member 64 may include several sets of ribs having the same angular orientation or ribs 66 may extend over most or all of the length of female member 64.

For ease of construction, female member 64 is split axially into two semi-circular sections 64a, 64b which are then bolted together after installation of ribs 66. Bolting together of the two semi-circular sections 64a, 64b is accomplished through the use of flanges 68, braces 70, spacers 72, bolts 74, and nuts 76 (see FIGS. 6, 7, and 8). Flanges 68 extend generally along the full length of female member 64. Optionally, spacers 72 may extend along the full length of female member 64 or a plurality of short spacers located adjacent bolts 74 may be used. For clarity, only some of the braces 70, spacers 72, bolts 74, and nuts 76 shown in FIG. 6 have been numbered. Section 52A of cable 52 is attached to the outer end of female member 64 by means of a pad eye 76.

Figure 4:
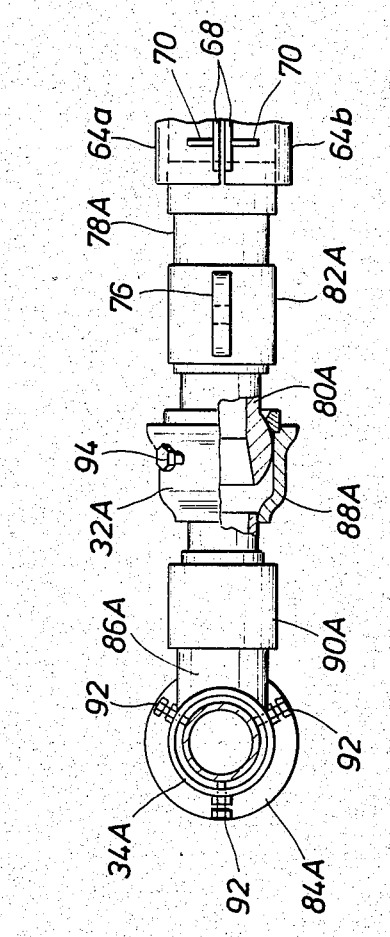
FIG. 4 is a plan view, in partial section, taken along line 4—4 of FIG. 3.

As best illustrated in FIGS. 3 and 4, ball and socket joints 32A, 32B are attached, respectively, to the outer ends of female member 64 and male member 56. Any suitable means of attachment may be used. As illustrated in FIG. 4, a spacer bar 78A is welded to the split halves 64a, 64b of female member 64. The ball portion 80A of ball and socket joint 32A is coupled to spacer bar 78A by means of coupling 82A which may be either welded or bolted to spacer bar 78A and ball portion 80A. Pad eye 76 is welded to coupling 82A. The details of the attachment of ball and socket joint 32B to male member 56 (using space bar 78B and coupling 82B) are similar to those for ball and socket joint 32A and, therefore, will not be further described.

Guide cones 34A, 34B are attached, respectively, to ball and socket joints 32A, 32B. Any suitable means of attachment may be used. Each of the guide cones 34A, 34B includes, respectively, a downwardly opening funnel portion 84A, 84B and a horizontal shank portion 86A, 86B. As illustrated in FIG. 4, the socket portion 88A of ball and socket joint 32A is coupled to horizontal shank portion 86A by means of coupling 90A which may be either welded or bolted to horizontal shank portion 86A and socket portion 88A. The details of attachment of ball and socket joint 32B to guide cone 34B (using coupling 90B) are similar to those for ball and socket joint 32A and will not be further described.

As noted above, remotely operable measuring template 26 also includes means for locking each of the guide cones 34A, 34B to its respective guide post 28A, 28B and means for locking variable length frame member 30 and ball and socket joints 32A, 32B after remotely operable measuring template 26 has been properly positioned. Referring now to FIGS. 3 and 4, the means for locking guide cones 34A, 34B to their respective guide posts 28A, 28B comprises a plurality of screws 92 mounted around the periphery of guide cones 34A, 34B. During positioning of remotely operable measuring template 26, screws 92 are retracted so as to not interfere with positioning of the guide cones 34A, 34B over guide posts 28A, 28B. After guide cones 34A, 34B are properly positioned, screws 92 are advanced to firmly lock guide posts 28A, 28B into guide cones 34A, 34B.

The means for locking ball and socket joints 32A, 32B comprises a second plurality of screws 94 mounted in the socket portions 88A, 88B of ball and socket joints 32A, 32B. During installation of remotely operable measuring template 26, screws 94 are retracted so as to not interfere with the movement of the ball and socket joints 32A, 32B. After remotely operable measuring template 26 has been properly positioned, screws 94 are tightened into contact with the ball portions 80A, 80B of ball and socket joints 32A, 32B to firmly lock ball and socket joints 32A, 32B and prevent further movement thereof.

As best illustrated in FIGS. 6 and 7, the means for locking variable length frame member 30 comprises a third plurality of screws 96 mounted in the split halves 64a, 64b of female member 64. Optionally, a plurality of bands 98 may be welded to the outside of the split halves 64a, 64b of female member 64 to provide additional thread engagement for screws 96. During positioning of remotely operable measuring template 26, screws 96 are retracted so as to not interfere with the telescoping movement of male member 56 and female member 64. After remotely operable measuring template 26 has been properly positioned, screws 96 are advanced into contact with male member 56 to firmly lock male member 56 into female member 64 and prevent further movement therebetween.

Returning now to FIGS. 1 and 2, the method of the present invention for remotely determining the distance and angular orientation between riser end 20 and pipeline end 24 will be described. As noted above, at the time when guide base structure 36 is attached to structure 10, typically prior to installation of structure 10, the distance and angular orientation between guide post 28A and riser end 20 is measured and recorded. Similarly, prior to installation of pipeline support base structure 42 the distance and angular orientation between guide post 28B and pipeline end 24 is measured and recorded. Therefore, in order to determine the distance and angular orientation between riser end 20 and pipeline end 24, it is only necessary to determine the distance and angular orientation between the two guide posts 28A, 28B. This is accomplished through the use of remotely operable measuring template 26.

Ideally, guide posts 28A, 28B will both be substantially vertical and located at the same relative elevation after deployment of guide base structure 36 and pipeline support base structure 42. However, due to irregularities in marine bottom 16, this will seldom be the case in actual practice. Remotely operable measuring template 26 is designed to compensate for misalignment and differences in elevation between guide posts 28A, 28B.

After deployment of guide base structure 36 and pipeline support base structure 42, an approximation of the distance between guide posts 28A, 28B may be obtained through the use of conventional acoustic transponders 104 mounted on guide base structure 36 and pipeline support base structure 42. A remotely operable measuring template 26 is then selected such that the operating length of variable length frame member 30 is larger than the approximate distance between guide posts 28A, 28B obtained using transponders 104. Prior to lowering of remotely operable measuring template 26, guidelines 48A, 48B are threaded, respectively, through guide cones 34A, 34B. As illustrated in FIG. 1, remotely operable measuring template 26 is then lowered along guidelines 48A, 48B by cable 52 until it has been properly positioned over guide posts 28A, 28B. Male member 56 telescopes into or out of female member 64 as required so that guide cones 34A, 34B are properly aligned with guide posts 28A, 28B. Ball and socket joints 32A, 32B pivot to compensate for misalignment and differences in elevation between guide posts 28A, 28B. Downwardly opening funnels 84A, 84B aid in properly positioning guide cones 34A, 34B over guide posts 28A, 28B. Proper positioning may be confirmed by use of a remotely operated vehicle (not shown).

After remotely operable measuring template 26 has been properly positioned, a remotely operated vehicle (not shown) is used to tighten screws 92, 94, and 96 thereby locking guide posts 28A, 28B into guide cones 34A, 34B and preventing further movement of variable length frame member 30 and ball and socket joints 32A, 32B. Guidelines 48A, 48B may then be remotely released from guide posts 28A, 28B, respectively, using known means. Alternatively, guidelines 48A, 48B may be retrieved along with their respective guide posts 28A, 28B as hereafter described.

The remotely operated vehicle then retracts screws 46 thereby releasing guide posts 28A, 28B from guide base structure 36 and pipeline support base structure 42, respectively. As illustrated in FIG. 2, the remotely operable measuring template 26, together with guide posts 28A, 28B is then returned to the surface. Remotely operable measuring template 26 holds guide posts 28A, 28B in the same spaced relationship as they were originally deployed on marine bottom 16. At the surface, the distance and angular orientation between guide posts 28A, 28B is measured and recorded. Optionally, this surface measurement can be performed by attaching the guide posts 28A, 28B to dummy base plates (not shown) located at the surface which duplicate the dimensions of the guide base structure 36 and the pipeline support base structure 42. Notches 102 on base plates 41A, 41B are used to confirm that the guide posts 28A, 28B are properly angularly oriented on the dummy base plates.

Following determination of the distance and angular orientation between guide posts 28A, 28B, the distance and angular orientation between riser end 20 and pipeline end 24 may be computed and a connecting spool piece (not shown) may be fabricated. The fabricated spool piece is then attached to a guide frame (not shown) which is lowered along guidelines 101A, 101B to guide posts 100A, 100B. Final connections between the spool piece and riser end 20 and pipeline end 24 are then performed using a remotely operated vehicle.

The apparatus and method of the present invention and the best mode contemplated for practicing the invention have been described. It should be understood that the invention is not to be unduly limited to the foregoing which has been set forth for illustrative purposes. Various modifications and alternatives of the invention will be apparent to those skilled in the art without departing from the true scope of the invention. For example, the method and apparatus of the invention may be used for remotely determining the distance and angular orientation between other types of structurally unconnected members. Other means for locking the various joints and members and for releasing the guide posts could be devised. Instead of splines and ribs, other means, such as square or polygonal cross sections, might be used to prevent rotation between the male member and the female member. All such modifications and alternatives are included within the scope of the present invention, as defined in the following claims.

What we claim is:

1. An apparatus for determining from a remote location the distance and angular orientation between a first member and a second member, said apparatus comprising:

first and second remotely releasable guide posts disposed, respectively, in known spaced relationships to said first and second members, the spaced relationship between said first and second guide posts being unknown; and remotely operable means for engaging said first and second remotely releasable guide posts and retrieving said guide posts to said remote location without changing the spaced relationship therebetween, whereby the distance and angular orientation between said first and second guide posts may be measured at said remote location and the distance and angular orientation between said first and second members may be computed from such measurement.

2. The apparatus of claim 1 wherein said remotely operable means for engaging said first and second remotely releasable guide posts and retrieving said guide posts to said remote location is a remotely operable measuring template comprising:

a variable length frame member having a first end and a second end;

first and second ball and socket joints attached, respectively, to said first and second ends of said variable length frame member;

first and second guide cones attached, respectively, to said first and second ball and socket joints, said first and second guide cones adapted to mate, respectively, with said first and second guide posts;

first means for locking said first and second guide posts, respectively, into said first and second guide cones;

second means for locking said first and second ball and socket joints to prevent movement thereof; and third means for locking said variable length frame member to prevent movement thereof.

3. The apparatus of claim 2 wherein said variable length frame member further comprises:

a female member; and a male member adapted to telescope axially into and out of said female member.

4. The apparatus of claim 3 wherein said female member has a plurality of ribs mounted therein and said male member has a plurality of splines mounted thereon, said ribs and said splines cooperating to prevent rotation between said female member and said male member.

5. The apparatus of claim 2 wherein said first means for locking said first and second guide posts into said first and second guide cones comprises a plurality of screws mounted in said first and second guide cones and adapted to be tightened into contact with said guide posts.

6. The apparatus of claim 2 wherein said first and second ball and socket joints each comprise a ball portion and a socket portion and wherein said second means for locking said first and second ball and socket joints comprises a plurality of screws mounted in said socket portions and adapted to be tightened into contact with said ball portions.

7. The apparatus of claim 3 wherein said third means for locking said variable length frame member comprises a plurality of screws mounted in said female member and adapted to be tightened into contact with said male member.

8. The apparatus of claim 1, said apparatus further comprising first and second base structures associated, respectively, with said first and second members and wherein said first and second guide posts are releasably attached, respectively, to said first and second base structures.

9. The apparatus of claim 8, said apparatus further comprising means for releasably attaching said first and second guide posts, respectively, to said first and second base structures.

10. The apparatus of claim 9 wherein said means for releasably attaching said first and second guide posts to said first and second base structures comprises a plurality of screws.

11. The apparatus of claim 8, said apparatus further comprising one or more redundant guide posts releasably attached to each of said first and second base structures.

12. The apparatus of claim 1, said apparatus further comprising first and second guidelines attached, respectively, to said first and second guide posts and extending from said first and second guide posts to said remote location.

13. An apparatus for determining from the surface of a body of water the distance and angular orientation between the end of a first section of subsea pipeline and the end of a second section of subsea pipeline, said first and second sections of subsea pipeline being disposed on the bottom of said body of water, said apparatus comprising:

first and second base structures associated, respectively, with the ends of said first and second sections of subsea pipeline;

first and second remotely releasable guide posts releasably attached, respectively, to said first and second base structures in known spaced relationships, respectively, to said ends of said first and second sections of subsea pipeline, the spaced relationship between said first and second guide posts being unknown; and remotely operable means for engaging said first and second remotely releasable guide posts and retrieving said guide posts to the surface of said body of water without changing the spaced relationship therebetween, whereby the distance and angular orientation between said first and second guide posts may be measured at said remote location and the distance and angular orientation between said ends of said first and second sections of subsea pipeline may be computed from such measurement.

14. The apparatus of claim 13, said apparatus further comprising first and second guidelines attached, respectively, to said first and second guide posts and extending from said first and second guide posts upwardly to said surface of said body of water.

15. The apparatus of claim 13 wherein said remotely operable means for engaging said first and second remotely releasable guide posts and retrieving said guide posts to the surface of said body of water is a remotely operable measuring template comprising:

a variable length frame member having a female member and a male member adapted to telescope axially into and out of said female member, said female member and said male member each having an outer end;

first and second ball and socket joints attached, respectively, to said outer ends of said female member and said male member, said ball and socket joints each having a ball portion and a socket portion;

first and second guide cones attached, respectively, to said first and second ball and socket joints, said first and second guide cones adapted to mate, respectively, with said first and second guide posts;

second means for locking said first and second ball and socket joints to prevent movement thereof; and third means for locking said variable length frame member to prevent movement between said female member and said male member.

16. The apparatus of claim 15 wherein said female member has a plurality of ribs mounted therein and said male member has a plurality of splines mounted thereon, said ribs and said splines cooperating to prevent rotation between said female member and said male member.

17. The apparatus of claim 15 wherein said first means for locking said first and second guide posts into said first and second guide cones comprises a plurality of screws mounted in said first and second guide cones and adapted to be tightened into contact with said guide posts.

18. The apparatus of claim 15 wherein said second means for locking said first and second ball and socket joints comprises a plurality of screws mounted in said socket portions and adapted to be tightened into contact with said ball portions.

19. The apparatus of claim 15 wherein said third means for locking said variable length frame member comprises a plurality of screws mounted in said female member and adapted to be tightened into contact with said male member.

20. The apparatus of claim 13 wherein said first and second remotely releasable guide posts are releasably attached to said first and second base structures by a plurality of screws.

21. The apparatus of claim 13, said apparatus further comprising one or more redundant guide posts releasably attached to each of said first and second base structures.

22. The apparatus of claim 13, said apparatus further comprising first and second acoustic transponders attached, respectively, to said first and second base structures.

23. A method for determining from a remote location the distance and angular orientation between a first member and a second member, said first and second members having associated therewith, respectively, first and second remotely releasable guide posts, said first and second remotely releasable guide posts being disposed, respectively, in known spaced relationships to said first and second members, said method comprising the steps of:

engaging said first and second remotely releasable guide posts with a remotely operable means;

remotely releasing said first and second remotely releasable guide posts; and retrieving said remotely operable means and said first and second remotely releasable guide posts to said remote location without changing the spaced relationship between said guide posts, whereby the distance and angular orientation between said guide posts may be measured at said remote location and the distance and angular orientation between said first and second members may be computed from such measurement.

24. A method for determining from the surface of a body of water the distance and angular orientation between the end of a first section of subsea pipeline and the end of a second section of subsea pipeline, said first and second sections of subsea pipeline being attached, respectively, to first and second base structures disposed on the bottom of said body of water, said method comprising the steps of:

releasably attaching first and second guide posts, respectively, to said first and second base structures in known spaced relationships, respectively, to said ends of said first and second sections of subsea pipeline;

engaging said first and second guide posts with a remotely operable means;

remotely releasing said first and second guide posts;

retrieving said remotely operable means and said first and second guide posts to said surface of said body of water without changing the spaced relationship between said first and second guide posts, whereby the distance and angular orientation between said first and second guide posts may be measured at said surface of said body of water and the distance and angular orientation between the ends of said first and second sections of subsea pipeline may be computed from such measurement.

* * * * *